United States Patent [19]

Morse

[11] Patent Number: 4,967,308
[45] Date of Patent: Oct. 30, 1990

[54] ENHANCED SAFETY DEVICE FOR AN ELECTRICAL APPLIANCE

[76] Inventor: Milton Morse, One Horizon Rd., Fort Lee, N.J. 07024

[21] Appl. No.: 355,195

[22] Filed: May 22, 1989

Related U.S. Application Data

[63] Continuation-in-part of Ser. No. 310,225, Feb. 13, 1989.

[51] Int. Cl.[5] .............................................. H02H 3/16
[52] U.S. Cl. ...................................... 361/42; 307/118; 307/326
[58] Field of Search .............................. 361/1, 42, 178; 307/117, 118, 326

[56] References Cited

U.S. PATENT DOCUMENTS

| | | | |
|---|---|---|---|
| 4,270,158 | 5/1981 | Gilardoni et al. | 361/42 |
| 4,464,582 | 8/1984 | Aragaki et al. | 361/42 X |
| 4,709,293 | 11/1987 | Gershen et al. | 361/42 X |
| 4,734,822 | 3/1988 | Gilardoni et al. | 361/42 |
| 4,751,603 | 6/1988 | Kwon | 361/42 |
| 4,791,519 | 12/1988 | Madsrn | 307/118 X |
| 4,797,772 | 1/1989 | Kaplonis | 207/326 X |
| 4,823,225 | 4/1989 | Foster et al. | 361/42 |

*Primary Examiner*—Derek S. Jennings
*Attorney, Agent, or Firm*—Arthur L. Plevy

[57] ABSTRACT

A safety device adapted for use in a hand held tool for minimizing electrical shock to a user includes a ground plane disposed inside the electrical tool, which, should the tool become immersed in water or become unreasonaly wet, provides a path for electrical current, which energizes a solenoid which, in turn, interrupts the AC power supply. The safety device is preferably encased in a variety of module. The safety device contains a power supply, such as a battery and/or electret, that is independent of the AC power supply. Thus, the safety device can be tripped even if the tool is not turned on.

12 Claims, 4 Drawing Sheets

FIG-6

ENHANCED SAFETY DEVICE FOR AN ELECTRICAL APPLIANCE

BACKGROUND OF THE INVENTION

This application is a continuation-in-part of "Improved Safety Device For an Electrical Appliance" given Ser. No. 07/310,225, filed Feb. 13, 1989, and is co-pending therewith.

This invention relates, generally, to applicances and, more particularly, to applicances such as electric hair dryers, curling irons, kitchen appliances and the like which include a means for disconnecting the electrical current therein should the device become saturated with water or for any other reason where a shock hazard exits.

The usage of consumuer appliances in present day households is increasing. There are many types of devices, particularly hand-held types, which generally fall into three categories: health and beauty, kitchen and electric hand tools. Health and beauty hand-held electrical devices generally include electric hair dryers, curling irons, electric razors; kitchen devices are generally mixers, blenders, coffee makers, etc.; while hand-held electric tools generally include drills, hedge-clippers, hand-held saws and the like.

The reasons for the proliferation of these devices is quite simple. They are generally inexpensive to purchase, while being convenient and well adapted to their individual purpose. However, use of these devices produces a distinct danger, particularly when used around water, or even steel wool pads. This danger is in the form of electrocution. Frequency of electrocution as a result of these types of devices, particularly hand-held electric hair dryers, is increasing. Since these types of devices are typically used in wet areas, it is readily apparent that there is a significant likelihood that the object will either be dropped into water in a bathtub or sink, or that it may become contaminated with water, such as by a splash of water when clipping shrubbery due to moisture present on the grass, adjacent foundations or the like.

Presently, ground faulting interrupters are being used in new and renovation construction, which are expressly for the purpose of minimizing the chances of electrocution. However, these types of devices have not been integrated into existing housing, which comprises the bulk of usage areas. Hence, safety is a problem from place to place and not merely between devices.

Another significant and distinct disadvantage, regardless of whether conventional ground faulting detectors are being utilized, is that fault current must generally flow through the user before the device detects and interrupts the flow of current therethrough. A further disadvantage is in the situation where there are no conventional ground fault interrupters and a separate interrupter is utilized with the device. Generally, conventional ground fault interrupters are somewhat bulky and cumbersome due to the fact that they not only detect and interrupt the flow of ground fault current, but also have user accessible test and reset buttons. This therefore drives up the cost and size requirements of any device wishing to utilize current interrupters.

Yet another disadvantage is that encompassing a standard ground fault interrupter into a hand-held electrical device, such as a hair dryer or the like, requires that the case or housing must be specifically designed or re-engineered in order to accommodate the components. Therefore, new molds must be made at considerable time and expense, and the outer profile of the hand-held device must necessarily be changed.

Accordingly, it is an object of the present invention to provide a current path in a hand-held electrical device which allows a current interruption device to operate more quickly.

It is a further object of the present invention to provide a current path in an electrically powered hand-held device which avoids leakage current paths through the user of the device.

It is yet another object of the present invention to produce a hand-held device which incorporates a current interruption mechanism as an integral part thereof.

Yet another object of the present invention is to produce a hand-held electrical device having current interruption integral therein, which when tripped, can only be reset by a special tool.

A still further object of the present invention is to produce a hand-held electrical device having a current interrupting mechanism integral therein which is resettable only after inspection by a trained service person.

Yet another object of the present invention is to produce a hand-held electrical device having an interrupting safety mechanism which is inexpensive to manufacture.

Another object of the present invention is to produce a device which adds few additional components and is easy to assemble.

Still a further object of the present invention is to produce a current interruption mechanism which is small and compact and may also fit into existing housing configurations and sizes of hand-held devices.

Yet another object of the present invention is to produce a safety device which is retrofittable to existing designs of hand-held devices.

Still another object of the present invention is to produce a safety device which will automatically and completely electrically disconnect the line cord from any interior components in the device when an electrically hazardous condition exists.

Another object is to hermetically seal all electrical interconnections with the line cord and the safety device.

It is also another object of the present invention to produce a safety mechanism which is in the form of a module which is extremely compact. A further object is to produce an invention which does not necessitate additional engineering, retooling, molding, and the like.

Still another object is to produce a mechanism which does not require the change or enlargement of the outer profile of the case of the hand-held electrical device.

Yet another object of the present invention is to produce a standard-size mechanism which may be purchased by any manufacturer and which may therefore be usable with any presently existing or future hand-held electrical devices.

Another object of the present invention is to produce a device having an electrical path for driving a load therein which comprises a ground plane disposed within the device in order to provide an electrical path, a detector with an input for detecting the presence of electrical current in the ground plane and an output for producing an electrical signal after detection of the presence of electrical current in the ground plane, and a current interrupter which has an input adapted to receive the output of the detector and an output for interrupting the electrical path in the device.

Another object of the present invention is to produce a current interruption mechanism for an electrical device having a first electrical path for driving a load, such as a heating coil, and an alternate ground path, and comprising a ground plane disposed within the electrical device for providing an electrical ground path; a detector disposed within the electrical device, comprising a gate having a biasing lead for detecting the presence of electrical current in the ground plane, an input connected to the first electrical path, and an output and an output lead thereat for producing an electrical signal proportional to the current in the ground path; a current interruption device disposed within the electrical device, having an input adapted to receive the electrical signal of the output lead, and an output for interrupting the first electrical path in the electrical device; and an electrical storage device in series circuit relationship with the output lead.

Yet another object is to energize the current interruption mechanism with an electrical storage device connected in series circuit relationship with the output and the current interruption mechanism lead.

Still another object of the invention is to provide a detachable safety cartridge for a hand-held electrical device wherein the electrical device has a first electrical path for driving a load therein and an alternate ground path, the cartridge comprising a module disposable within a hand-held electrical device for interrupting the flow of electrical current in the first electrical path in response to detecting current in the alternate ground path.

A final object of the present invention is to provide a safety device for a hand-held electrical device having a first electrical path for driving a load therein and an alternate ground path with the following: a ground plane disposed within the electrical device for providing an electrical ground path; a detection device disposed within the electrical device, comprising a gating device having a biasing lead for detecting the presence of electrical current in the ground plane, and for producing an electrical signal proportional to the current in the ground plane; a power supply connected in series with the collector-emitter path of the gating device and with the current interruption device having an output for interrupting the first electrical path in the electrical device.

DETAILED DESCRIPTION OF THE PREFERRED EMBODIMENT

Figure 1:
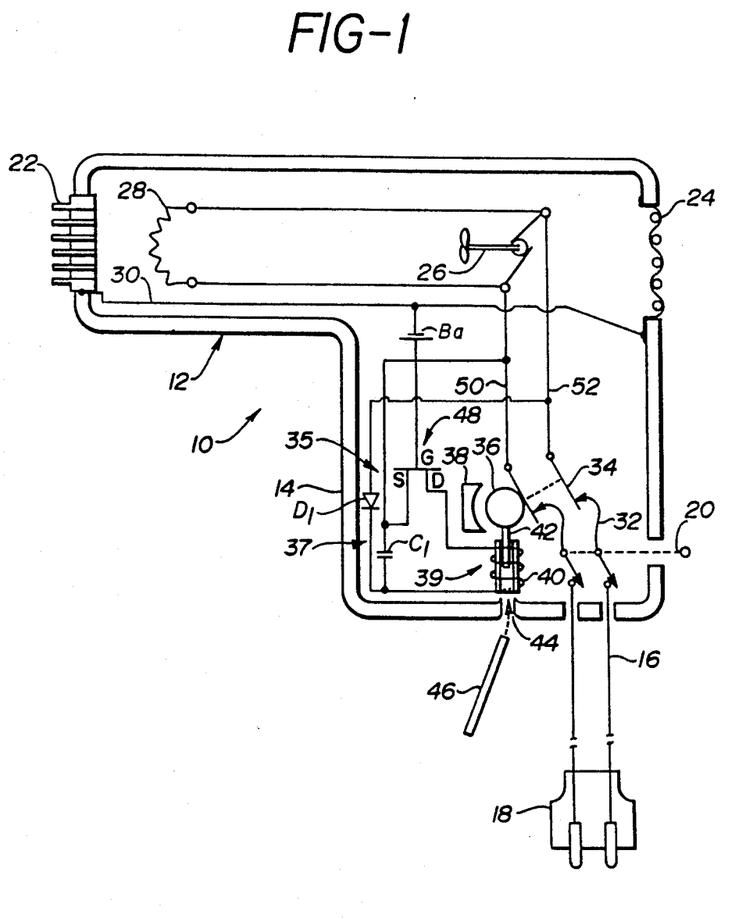
FIG. 1 is a representational view of an electric hand-held hair dryer incorporating the present invention.

Referring now to FIG. 1, there is shown a diagrammatic view of the device encompassing the preferred embodiment of the present invention. Shown is an electric hand-held hair dryer 10. It is to be understood that other types of hand-held electric devices can and may be used without departing from the spirit and scope of the present invention such as, for example, electric curling irons, hand tools, mixers, blenders the like. The hair dryer 10 is comprised of a barrel 12 and handle 14 housing a number of components therein. At one end of handle 14 is an electric cord 16 which terminates at plug 18 and is suitable for typical household use. An ON/OFF lever 20 is disposed at the base of handle 14 and functions to actuate an ON/OFF switch 32, which may be of any suitable type such as slide, rotary or the may be single pole, double pole or any other suitable or desired configuration. At one end of barrel 12 is a front grill 22 which permits the passage of heated air therethrough as described more fully below. A screen 24 is typically located at the rear end of barrel 12 and is utilized so that foreign matter, i.e., hair, cannot be sucked into barrel 12. A blower or fan is generally disposed adjacent to screen 24 and takes air in through screen 24 and passes air over heating element 28. Heating element 28, in turn, heats the air before the air exits through the front grill 22. A ground screen or plane 30 is used to electrically connect front grill 22 to screen 24. Further, screen/plane 30 provides a continuous electrical path throughout the interior of hair dryer 10 By grcund screen/plane 30 is meant any electrically conductive means to direct the current to a current interrupter device and, therefore, the ground plane 30 is not necessarily at earth "ground" potential. In this manner, should hair dryer 10 fall into water or should hair dryer 10 become wet to an unacceptable level, a ground path is provided between electrically conductive "live" areas in the hair dryer 10 and the ground screen. This electrical path is represented by dashed line 202, which is representative of an electrical short. The electrical connection between grill and screen 22 and 24 respectively via a ground screen/plane 30 may be accomplished in any number of suitable ways, such as crimp type fits, compression type fits, soldering or welding to mention a few. Any of the live areas can and may include exposed portions of hot or neutral wires 50,52 respectively, portions of heating element 28 or blower motor 26 as well as portions of ON/OFF switoh 32 having load contacts 34 therein.

It has been determined that the ground screen/plane 30 may be in a number of embodiments or configurations, although all are acceptable as long as a continuous electrically conductive ground path is provided. Accordingly, the ground screen/plane 30 may be in the form of a metal screen, or plating disposed on the interior portions of hair dryer 10, or on one side of heating insulators (not shown) which are typically disposed in barrel 12, and may be fabricated from aluminum or other type of metal foil. In this manner, a current return path is readily available between any of the electrically "live" components inside hair dryer 10 (as previously discussed) through water and hence to ground screen/plane 30. It has been found that this provision of an alternate return or ground path minimizes or eliminates the chance of current flow through a user, particularly when the dryer 10 merely has too much water present such as having water splashed on to it as it lies adjacent a sink or, in the case of a hand tool, it is laid down or adjacent to a puddle.

It has been found that the provision of a qround screen/plane 30 provides another distinot and significant advantage in that present hair dryer or appliance design need not be changed from two conductor to three conductor cord sets (not shown) since present designs are most cost sensitive. For this reason I have found that provision of an interrupt device 35, which is contained directly in handle 14, is appropriate. The interrupt device 35 is generally comprised of two portions, an electronic components portion 37 and a mechanical interlock portion 39. The function of the electronic component portion 37 is to detect and utilize electrical energy passing through or present on ground screen/plane 30. The mechanical interlock 39 including a ball 36, a coil 40 and a movable rod 42, is used to physically disconnect incoming power via electric cord 16 to the remainder of hair dryer 10.

The electronic components 37 include field effect transistor (FET) 48 having its gate terminal (G) connected to a terminal of biasing battery $B_a$, with the remaining lead of the battery $B_a$ connected to ground screen/plane 30. Therefore, the biasing battery $B_a$ will render the FET 48 conductive in the event of any current leakage between ground screen/plane 30 and elsewhere in the device 10. Battery $B_a$, a lithium or hearing-aid type (or other long shelf life battery) is utilized to provide an internal power supply which causes mechanical interlock 39 to be energized regardless of whether plug 18 has power applied thereto, should the shock hazard be present. Therefore, before plug 18 is energized, the interrupt device 35 was previously tripped and no chance of electrical short or the like can be applied to the user.

Source terminal (S) of FET 48 is connected to hot lead 50 and to one terminal of condenser C1. The remaining terminal of condenser C1 is connected to one terminal of coil 40 and to the cathode of diode D1. The remaining terminal of diode D1 is connected to neutral lead 52. The drain terminal (D) of FET 48 is connected directly to the remaining terminal of coil 40. A person skilled in the art can appreciate that the substrate of FET 48 must be connected such that the battery $B_a$ provides a signal to the gate of FET 48 whenver the ground plane 30 is electrically connected to either lead 50 or 52 as indicated by 202.

Coil 40 is preferably a "latch" type solenoid coil having movable rod 42 disposed therein. In the preferred embodiment of the present invention, movable rod 42 is either an integral part of or connected to ball 36. Therefore, energization of coil 40 causes ball 36 to be urged downward. However, it is to be understood that rather than rod 42 pulling ball 36 downward, similar satisfactory results may be obtained by having rod 42 merely push ball 36 upward. A stop 38 is provided to maintain ball 36 in a stationary position with ball 36 being used to bias spring-type load contacts 34 against appropriate terminals of ON/OFF switch 32. In this manner, when rod 42 is urged downward, due to electromotive force present in coil 40, ball 36 is similarly urged downwards with the result that load contacts 34 will electrically and mechanically disconnect from the contacts lo of ON/OFF switch 32.

Therefore, when current exists between ground screen 30 and hot wire 50 or neutral wire 52 as indicated by 202, current will be permitted to flow through the drain source path of FET 48 with the result that coil 40 will be energized. Accordingly, in the preferred embodiment of the present invention, a ground fault in the traditional sense is not required in order to "trip" the present invention and prevent user injury. Rather, a current between ground screen/plane 30 and any electrically live component, such as is present during a shock hazard, will be detected and will result in operation of interrupt device 35. This shock hazard may be the result of immersion, high humidity, steel wool used during cleaning, or as a result of damage. Such damage may occur when, for example, a user tries to clean a toaster by using a knife and causes a short therein.

If a shock hazard exists, the "user" is not in the electrical return path and hence is not subject to shock before the interrupt device 35 will trip. Accordingly, FET 48 and coil 42 are "biased" to ensure rapid response time. As can be ascertained from FIG. 1, a signal applied to the gate of FET 48 causes the FET 48 to conduct along tis drain-source path, thereby allowing condenser C1 to energize the coil 40. Consequently, when dryer 10 is eventually plugged in, there will be no chance of a shock hazard. A signficant advantage of a battery $B_a$ in this type of circuit operation is that even if plug 18 is not plugged into a receptacle, the battery supplies the power to enable the interrupt device 35 to function.

When tripped, rod 42 will, as previously mentioned, be urged downward. Further, in the preferred embodiment of the present invention, rod 42 is of an appropriate length such that after tripping it cannot and will not emerge through a reset aperture/keyway 44 present in the underside of handle 14. In the preferred embodiment of the present invention, return of rod 42 to the normal position which enables load contacts 34 to be energized, cannot be accomplished except by use of a reset key 46. Accordingly, reset key 46 must be passed through reset aperture/keyway 44 in order to properly reorient rod 42. Preferably, keyway 44 and hence reset key 46 are of a cross-type configuration. In this manner, reset may only be accomplished by an individual having the correct reset key. Accordingly, it is preferred that only qualified service individuals be given a reset key 46, thereby adding an extra level of safety. Should interrupt device 35 trip, the user would be required to bring the dryer 10 to any service center having qualified technicians who will then examine hair dryer 10 to ensure that its interior is dry, and that there are no damaged components, frayed wires or extraneous matter or the like, befor the resetting of interrupt device 35.

Additionally, in the preferred embodiment of the present invention, it is preferred that load contacts 34 and ON/OFF switch 32 be at least moisture proof and preferably waterproof. Therefore, should a hair dryer 10 be immersed in water, water current flow into the switch 32 which might permit a flow of current through ON/OF switch 32 to load contacts 34 at any time. Alternately, in the present invention, a reset aperture/keyway may not be utilized with the result that a trained service technician must open up the hair dryer 10 to ensure that they physically inspect the interior thereof and to effectuate reset of mechanical interlock 39.

Further, in the preferred embodiment of the present invention, condenser C1 is an electret which is well known and understood by one skilled in the art. An electret is highly desirable since it retains a charge, absent outside electrical stimulation. In this regard, it is not necessary for condenser C1 to build a charge prior to energization of coil 40. Since the electret retains its own charge, quick energization of coil 40 is inherent. Hence, this cuts down significantly on the interrupt time of mechanical interlock 39. This is especially important since electromagnets, such as coil 40, typically have a relatively "long" energization time when viewed in terms of the time required for an electrical hazard to harm an individual. For this reason, a fast-acting FET is preferred. Additionally, should it be desired, a transient filter (not shown) may be inserted in series circuit relationship between the source terminal of FET 48 and the electrical connection to the ground screen/plane 30 should nuisance trips be a concern or a problem.

Figures 2, 3, 4:
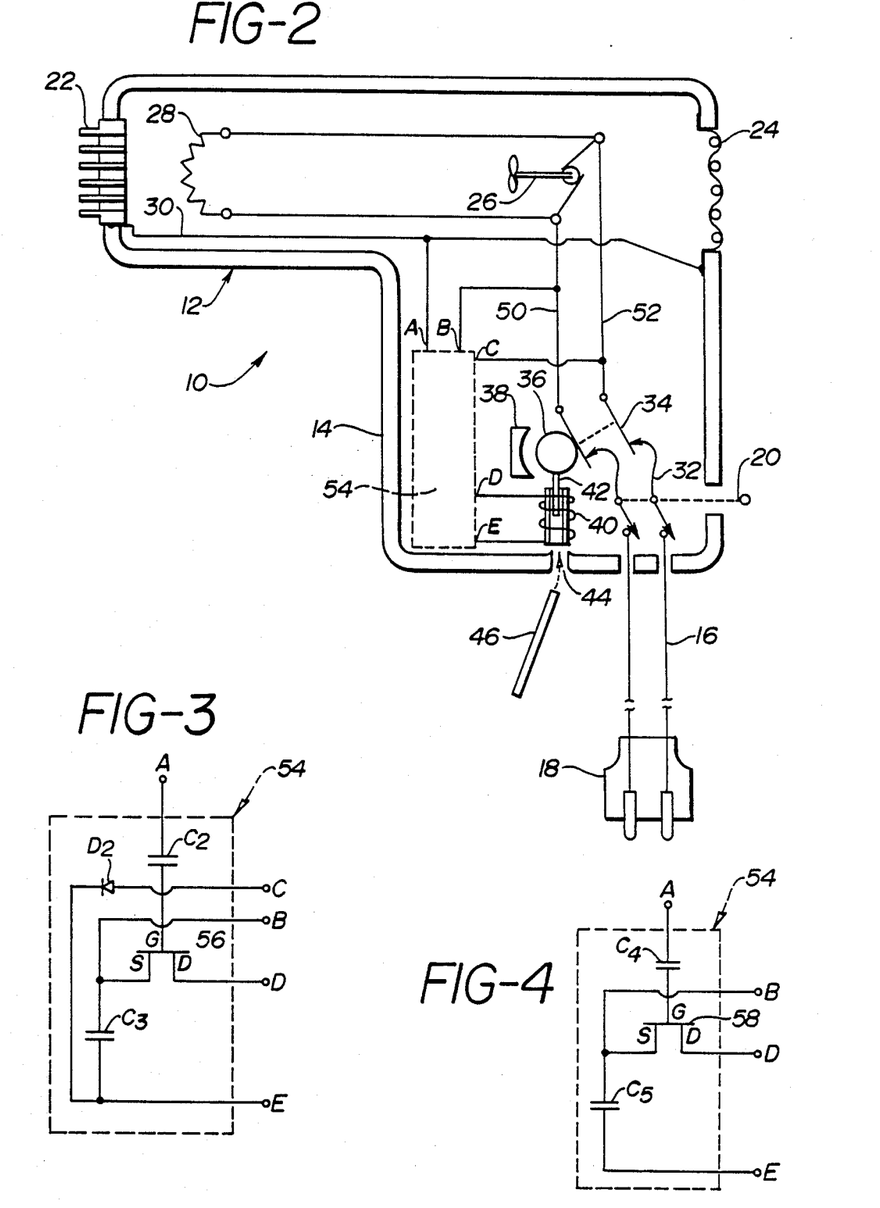
FIG. 2 is a view substantially identical to FIG. 1 illustrating an alternate embodiment of the current interruption mechanisms.
FIGS. 3 and 4 show two alternate circuit configurations for effecting current interruption.

Referring now to FIG. 2, a view substantially similar to FIG. 1 is shown. Accordingly, only the differences between FIGS. 1 and 2 will be explained herein. Shown is trigger mechanism 54 which has a number of electrical appliances connected thereto. Ground screen/plane 30 is connected via terminal A to trigger mechanism 54 while similarly terminals D and E of trigger mechanism 54 are respectively connected to coil 40. Terminal B is connected to the hot lead 50 while terminal C is connected to neutral lead 52, although, for the reasons previously mentioned, terminals B and C may be reversed. Accordingly, trigger mechanism 54 may encompass a variety of different comppnents or alternate embodiments.

Referring now to FIGS. 3 and 4, schematic representations of alternate embodiments of the present invention may be viewed. More particularly, trigger mechanism 54, as shown in FIG. 3, would supplant electronic components 37 disposed in FIG. 1 while similarly trigger mechanism 54 of FIG. 4 would supplant electronic components 37 of FIG. 1. Referring to FIG. 3, terminal A connected to ground screen/plane 30 is connected to one terminal of condenser C2. The remaining terminal of condenser C2 is connected to the gate terminal (G) of FET 56. The drain terminal (D) of FET 56 is connected to terminal D or one terminal of coil 40. Terminal B, connected to hot lead 50, is connected to the source terminal (S) FET 56 and to one terminal of condenser C3. The remaining terminal of condenser C3 is connected to the remaining lead of terminal E and hence, coil 42 and also to the cathode of diode D2. The anode of diode D2 is connected to terminal C, neutral lead 52. It is preferred that condensers C2 and C3 be electrets, thereby providing a certain amount of bias to FET 56 and coil 42 for the purpose of decreasing the "trip time" of mechanical interlock 39. Additionally, by connecting to neutral lead 52, one half-cycle of delay time is eliminated since alternating current is utilized and hence lead 52 is at a high potential when lead 50 is at a low potential.

FIG. 4 functions in a manner similar to that of FIG. 3 but is, of course, somewhat simpler. There, terminal A is connected to one terminal of condenser C4 while the remaining terminal of condenser C4 is connected to the gate terminal (G) of FET 58. The drain terminal (D) of FET 58 is connected to the D terminal while the source terminal of FET 58 is connected to terminal B and to one terminal of condenser C5. The remaining terminal of condenser C5 is connected to terminal E. As before, it is preferred that condensers C4 and C5 be electrets, thereby shortening the interrupt time.

Figure 5:
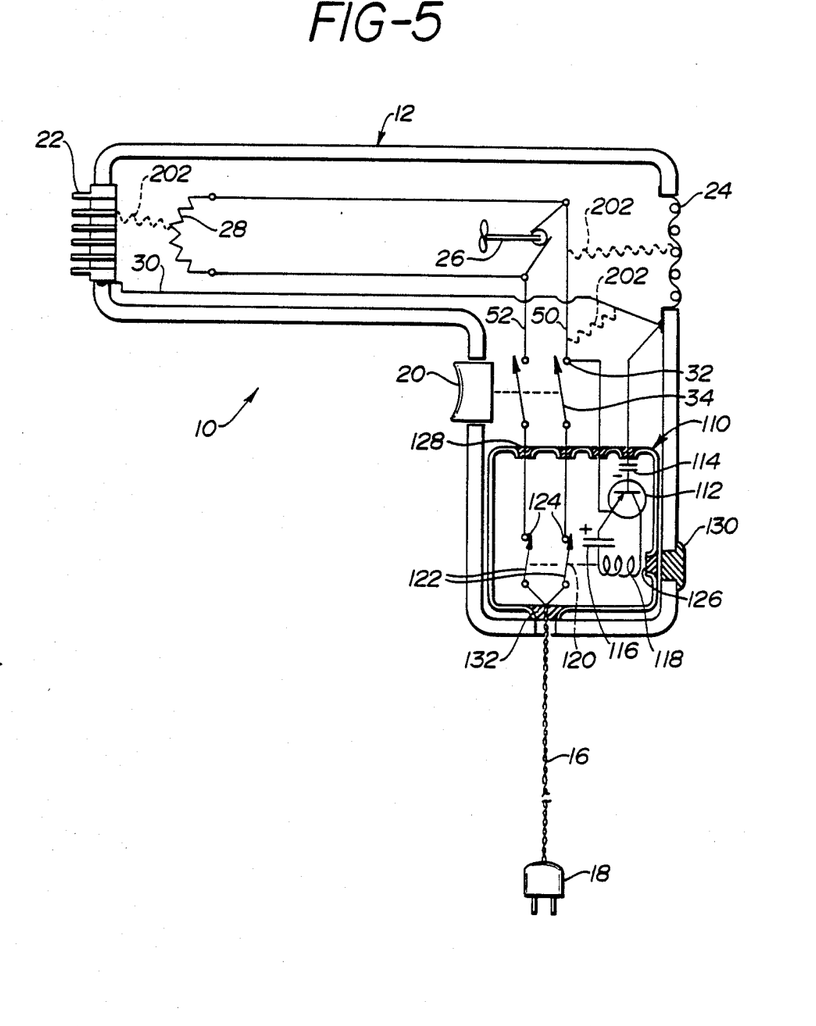
FIG. 5 shows an additional circuit configuration for effecting current interruption using a module approach.

Referring now to FIG. 5, another alternate embodiment is shown. Accordingly, only the differences between FIGS. 1 and 5 will be explained herein. Shown is safety cartridge 110 which is preferably a "module" containing the components indicated therein, and which is disposable within the hair dryer 10. By safety cartridge or module is meant the enclosure of the electrical and/or mechanical components or interlock of the present invention into a package. Therefore, the detection and current interruption portions may be packaged in a single enclosure (or separately) either in a case, or encapsulated, or any other similar means for manufacturing purposes. It is preferred, although not absolutely necessary, that safety cartridge 110 be sealed so as to be waterproofed, such as by hermetic sealing or encapsulation or the like. Therefore, the cartridge 110 may be an off-the-shelf item that is readily distributed to manufacturers of hand-held electrical devices. Disposed within safety cartridge 110 is current interruption circuitry, that would make the module perform the same function as electronic and mechanical components 37, 39 previously described in FIG. 1.

Readily apparent when viewing FIG. 5 is that due to the preferred encapsulation of the cartridge 110 and the position of disconnect 122 prior to the contacts of the on/off switch 20, all components in the dryer 10 are automatically and electrically isolated from the line cord 16.

Here, sensing electret 114 has one terminal connected to ground screen/plane 30 and the remaining terminal connected to the base terminal of PNP transistor 112. It is understood that an NPN, a FET or any other type of electronic triggering or gating device may be utilized without departing from the spirit and scope of the present invention. The collector,of transistor 112 is connected to one terminal of the coil 119 of /magnetic trip switch 118. The emitter terminal of PNP transistor 112 is connected to one terminal of tripping electret 116 with the remaining terminal of tripping electret 116 connected to the remaining terminal of the coil 119 comprising trip switch 118. The emitter of PNP transistor 112 is also connected to hot lead 50 lo inside the hand-held device itself. An actuating bar 120 disconnects contact arms 122 from contacts 124 during energization. of the device during an electrical hazard. A reset aperature 126 is axially disposed from actuating bar 120 and is an optional item which may be used to reset the coil 119 when tripped similar to the reset aperature 44 of FIG. 1. Aperture 126 is preferably a seal and is adjacent sealing plug 130 disposed in the housing of the hand held electrical device 10. Therefore, reset of the cartridge 110 tripping may be accomplished by removal of plug 130 and the insertion of a reset tool as described above. Accordingly, the seal of aperture 126 may be replaceable or a "self sealing" type of seal.

A plurality of termination points 128 are utilized to interconnect the safety cartridge 110 with the different eleotrioal oontaot points inside the hair dryer 10. It is to be understood, however, that these termination points 128 should be internal to the safety cartridge 110, thereby minimizing the chances of electrical short therebetween should an electrically hazardous condition present itself. Accordingly, each termination point 128 is hermetically sealed in the form of plugs which can be molded into place similar to reset aperatures 126 and 132. Similarly, seal 132 hermetically seals the joint between the cartridge 110 and cord 16. However, any arrangement which prohibits the introduction of extraneous matter into the electrical connection is acceptable, such as waterproof type connectors which are readily available and known to one skilled in the art. Similarly, with respect to electric cord 16 and plug 18, the entire safety cartridge 110 is preferably sold with the cord and plug 16, 18 attached thereto or electrical connection may be thereafter made by the manufacturer or assembler of the hair dryer 10. The operation of the cartridge 110 can be ascertained from FIG. 5. Moisture designated by 202, which is present during a hazardous condition, completes a circuit between the base-emitter path of the PNP transistor 112 and the sensing electret 114. The resulting signal sent to the base of the PNP transistor 112 causes the transistor 112 to conduct, which allows tripping electret 116 to energize the coil 119 and thereby disconnect the dryer 10 from the line cord 16.

Figure 6:
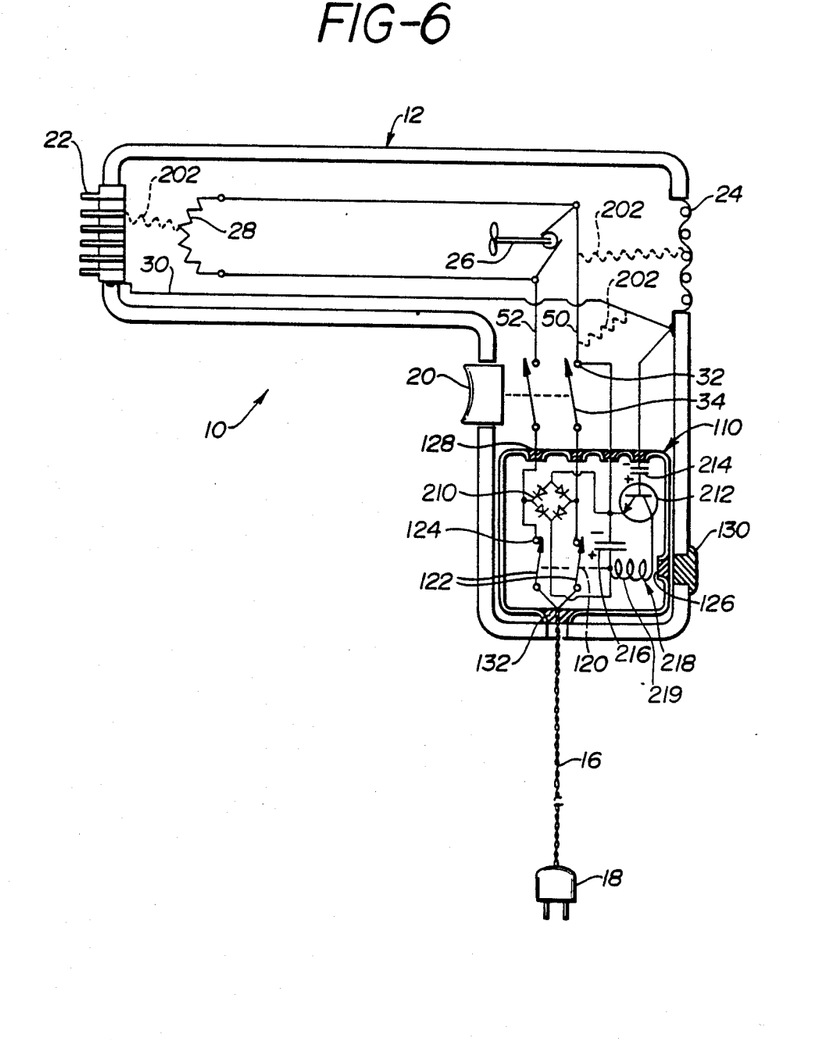
FIG. 6 illustrates yet another circuit configuration for effecting current interruption.

Referring to FIG. 6 there is shown still another alternate embodiment of the present invention. It is to be understood that the overall operation of the safety cartridge 110 is substantially similar to previously described embodiments and in this regard a description thereof will not be reiterated. Shown is the use of a full-wave bridge rectifier 210 having its inputs connected across the contact arms 122. The positive output terminal of full wave bridge rectifier 210 is connected to the emitter of switching transistor 212, one terminal of tripping electret 216 and to hot lead 50. The negative output terminal of full-wave bridge 210 is connected to one terminal of the coil 219 of magnetic trip switch 218 and to the remaining terminal of tripping electret 216. The remaining terminal of coil 218 is connected to the collector of transistor 212. The base of transistor 212 is connected to one terminal of sensing electret 214. The remaining terminal of sensing electret 214 is connected to ground screen/plane 30. It is to be remembered that although a bipolar NPN transistor is shown, other types of transistors such as PNP transistors may be utilized while similarly, other types of rectifier circuits can be utilized.

Accordingly, during operation the device full-wave bridge rectifier 210 maintains electret 216 in a charged state thereby in effect, "prebiasing" coil 218. Accordingly, during a ground fault condition, transistor 212 is caused to conduct with the result that coil 218 would be energized and contact alarms 122 will be urged by actuating bar 120 and being disconnected from contacts 124. An important feature of this prebiasing of coil 218, is to substantially diminish the delay time from an actual ground fault condition and energization of coil 218 and subsequent disconnection of contact arms 122. It is to be remembered that electrets 214 and 216 may have substituted therefore a standard capacitors without departing from the spirit and scope of the present invention.

It is to be understood that although only several variations of electronic components are shown, other variations may be utilized without departing from the spirit and scope of the present invention. For example, a standard ground fault interrupter circuit such as LM1851 Ground Fault Interrupter produced by National Semiconductor Corporation which are readily available and known to one skilled in the art may be utilized. Additionally, other types of mechanical interlocks may be utilized without departing from the spirit and scope of the present invention. Further, current interruption may be accomplished by replacing the electronic components and/or mechanical interrupt with other suitable current interrupting devices, such as, for example, high current transistors, latching relays, opto-isolators, and the like.

Having thus described the present invention in detail, it is to be understood that the foregoing description is not intended to limit the spirit and scope thereof. What is desired to be protected by Letters Patent is set forth in the appended claims.

What is claimed is:

1. A safety device adapted for use in an electrical appliance having an AC poer supply connected to a load by a first electrical path, comprising:
   ground plane means disposed within said electrical device for providing a second electrical path;
   electrical storage means for providing current through said ground plane means whenever said first electrical path is electrically connected to said ground plane means;
   current interruption means, disposed within said electrical device and responsive to said current provided by said electrical storage means, for electrically disconnecting the AC power supply from the first electrical path; and
   power supply means for providing a source of operating potential to said current interruption means, said first power supply means being independent of the AC power supply, wherein said current interruption means can disconnect the AC power supply from the load before the AC power supply is connected to the load.

2. A device according to claim 1, wherein said current interruption means includes a solenoid, mechanical interlock means actuated by said solenoid for disconnecting the AC power supply from the load, and electrical connecting means responsive to the current in said ground plane means for electrically connecting said power supply means to said solenoid to energize said solenoid and thereby cause said mechanical interlock means to disconnect the AC power supply from the load.

3. A device according to claim 2, wherein said power supply means includes a first electrical storage means for energizing said solenoid, and a second electrical storage means for providing a current on said ground plane means that actuates said gating means.

4. A device according to claim 5, wherein said first electrical storage means is an electret capacitor.

5. A device according to claim 4, further comprising energizing means for energizing said solenoid while the appliance is operative.

6. A device according to claim 5, wherein said energizing means includes rectifier means connected in parallel with said first electrical storage means and operated by the AC power supply for providing a source of operating potential to said solenoid.

7. A device according to claim 3, wherein said second electrical storage means is an electret.

8. A device according to claim 3, wherein said second electrical storage means is a lithium battery.

9. A device according to claim 3, wherein said electrical connecting means is a field effect transistor having its gate terminal connected to said second electrical storage means, and its drain-source path connected in series with said first electrical storage means and said solenoid.

10. A device according to claim 3, wherein said electrical connecting means is a bipolar transistor having its base terminal connected to said second electrical storage means, and its collector-emitter path connected in series with said first electrical storage means and said solenoid.

11. A device according to claim 10, further including module means for disposably mounting said current interruption means, said electrical storage means and said power supply means within the electrical appliance such that said current interruption means, said electrical storage means and said power supply means can be inserted into the electrical appliance and withdrawn therefrom, said module means including second electrical connecting means for connecting said current interruption means and said electrical storage means to the first electrical path and said ground plane means, respectively.

12. A device according to claim 11, wherein said module means is hermetically sealed within said appliance.

* * * * *